(12) United States Patent
Kato

(10) Patent No.: US 11,018,386 B2
(45) Date of Patent: May 25, 2021

(54) BATTERY PACK

(71) Applicant: Yazaki Corporation, Tokyo (JP)

(72) Inventor: Takuya Kato, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 149 days.

(21) Appl. No.: 16/351,427

(22) Filed: Mar. 12, 2019

(65) Prior Publication Data

US 2019/0288356 A1   Sep. 19, 2019

(30) Foreign Application Priority Data

Mar. 16, 2018   (JP) .............................. JP2018-049451

(51) Int. Cl.
| | |
|---|---|
| *H01M 10/6551* | (2014.01) |
| *H01M 10/653* | (2014.01) |
| *H01M 10/643* | (2014.01) |
| *H01M 10/613* | (2014.01) |
| *H01M 50/20* | (2021.01) |
| *H01M 50/502* | (2021.01) |
| *H01M 10/6555* | (2014.01) |
| *H01M 10/655* | (2014.01) |

(52) U.S. Cl.
CPC ..... *H01M 10/6551* (2015.04); *H01M 10/613* (2015.04); *H01M 10/643* (2015.04); *H01M 10/653* (2015.04); *H01M 10/655* (2015.04); *H01M 10/6555* (2015.04); *H01M 50/20* (2021.01); *H01M 50/502* (2021.01); *H01M 2220/20* (2013.01)

(58) Field of Classification Search
CPC .. H01M 10/643; H01M 2/206; H01M 2/1077; H01M 2220/20; H01M 10/613; H01M 10/65; H01M 10/653; H01M 10/655; H01M 10/6551; H01M 10/6555
See application file for complete search history.

(56) References Cited

U.S. PATENT DOCUMENTS

| | | | | |
|---|---|---|---|---|
| 6,087,036 A | * | 7/2000 | Rouillard ............... | H01M 2/202 |
| | | | | 429/120 |
| 9,337,465 B2 | * | 5/2016 | Jeong .................... | H01M 2/204 |
| 2009/0297892 A1 | | 12/2009 | Ijaz et al. | |

(Continued)

FOREIGN PATENT DOCUMENTS

| | | |
|---|---|---|
| EP | 2 031 672 A1 | 3/2009 |
| FR | 2 963 486 A1 | 2/2012 |
| JP | 2002-373708 A | 12/2002 |

*Primary Examiner* — Carlos Barcena
(74) *Attorney, Agent, or Firm* — Kenealy Vaidya LLP

(57) ABSTRACT

A battery pack includes a heat conductive member that has heat conductivity and is provided between a plurality of battery modules which are adjacent to each other in a width direction. A heat dissipation unit dissipates heat conducted to the heat conductive member. A bus bar for modules is provided on one side of the battery modules in a height direction. The heat conductive member includes a contact portion and an extended portion. The contact portion is in contact with the plurality of battery modules which are adjacent to each other in the width direction. The extended portion extends from a side opposite to the bus bar for modules of the battery modules in a height direction and is connected to the heat dissipation unit.

11 Claims, 5 Drawing Sheets

(56) References Cited

U.S. PATENT DOCUMENTS

| | | | | |
|---|---|---|---|---|
| 2011/0269008 A1* | 11/2011 | Houchin-Miller | | B60L 58/26 |
| | | | | 429/120 |
| 2012/0231317 A1* | 9/2012 | Shimizu | | H01M 10/6567 |
| | | | | 429/120 |
| 2013/0183566 A1* | 7/2013 | Wayne | | H01M 50/213 |
| | | | | 429/120 |
| 2014/0295240 A1* | 10/2014 | Takeda | | H01M 10/617 |
| | | | | 429/120 |
| 2019/0148681 A1* | 5/2019 | Park | | H01M 10/613 |
| | | | | 429/120 |
| 2019/0181399 A1* | 6/2019 | Kaga | | H01M 10/653 |

\* cited by examiner

BATTERY PACK

CROSS-REFERENCE TO RELATED APPLICATION(S)

The present application claims priority to and incorporates by reference the entire contents of Japanese Patent Application No. 2018-049451 filed in Japan on Mar. 16, 2018.

BACKGROUND OF THE INVENTION

1. Field of the Invention

The present invention relates to a battery pack.

2. Description of the Related Art

In the related art, as a battery pack, for example, Japanese Patent Application Laid-open No. 2002-373708 discloses a battery pack including a plurality of unit cells and a heat dissipation unit that dissipates heat generated by the plurality of unit cells. The heat dissipation unit includes a heat pipe that extends in an arrangement direction of the plurality of unit cells and is in contact with surfaces of the plurality of unit cells, and a heat dissipation fin that dissipates heat that is transferred to the heat pipe.

However, in the battery pack described in Japanese Patent Application Laid-open No. 2002-373708, for example, since the heat pipe extends in the arrangement direction of the plurality of unit cells, there is a concern that a heat dissipation effect may be different between the center and an outer side in the arrangement direction of the unit cells.

SUMMARY OF THE INVENTION

Here, the invention has been made in consideration of such circumstances, and an object thereof is to provide a battery pack capable of appropriately dissipating heat of a battery body.

In order to solve the above mentioned problem and achieve the object, a battery pack according to one aspect of the present invention includes a battery module group that includes a plurality of battery modules including a plurality of battery bodies which include one battery cell (21a) or a plurality of the battery cells connected to each other in parallel, which are provided to be erected in a height direction in which a positive electrode and a negative electrode are opposite to each other, and which are arranged in an even number in a first direction orthogonal to the height direction, and a bus bar for battery bodies which connects the battery bodies adjacent to each other in the first direction in series, and a bus bar for modules which connects the battery modules, which are adjacent to each other in a second direction among the plurality of battery modules arranged in the second direction orthogonal to the first direction, in series; a heat conductive member that has heat conductivity, and is provided between the plurality of battery modules adjacent to each other in the second direction; and a heat dissipation unit that dissipates heat conducted to the heat conductive member, wherein the bus bar for modules is provided on one side of the battery modules in the height direction, and the heat conductive member includes a contact portion that is in contact with the plurality of battery modules adjacent to each other in the second direction, and an extended portion that extends from a side opposite to the bus bar for modules of the battery modules in the height direction and is connected to the heat dissipation unit.

According to another aspect of the present invention, in the battery pack, it is preferable that a housing that has heat conductivity and accommodates the battery module group and the heat conductive member, wherein the extended portion is in contact with an inner side of the housing, and the housing functions as the heat dissipation unit.

According to still another aspect of the present invention, in the battery pack, it is preferable that the heat conductive member includes a plurality of heat conductive sheets which are formed in the same sheet shape, and each of the heat conductive sheets is provided between the plurality of battery modules adjacent to each other.

According to still another aspect of the present invention, in the battery pack, it is preferable that in the battery bodies, the plurality of battery cells are arranged in two rows in the first direction.

According to still another aspect of the present invention, in the battery pack, it is preferable that the bus bar for modules includes a first bus bar for modules which is provided in a battery module on one side between the battery modules adjacent to each other, a second bus bar for modules which is provided in the battery module on the other side and is different from the first bus bar for modules, and a connection portion that connects the first bus bar for modules and the second bus bar for modules.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
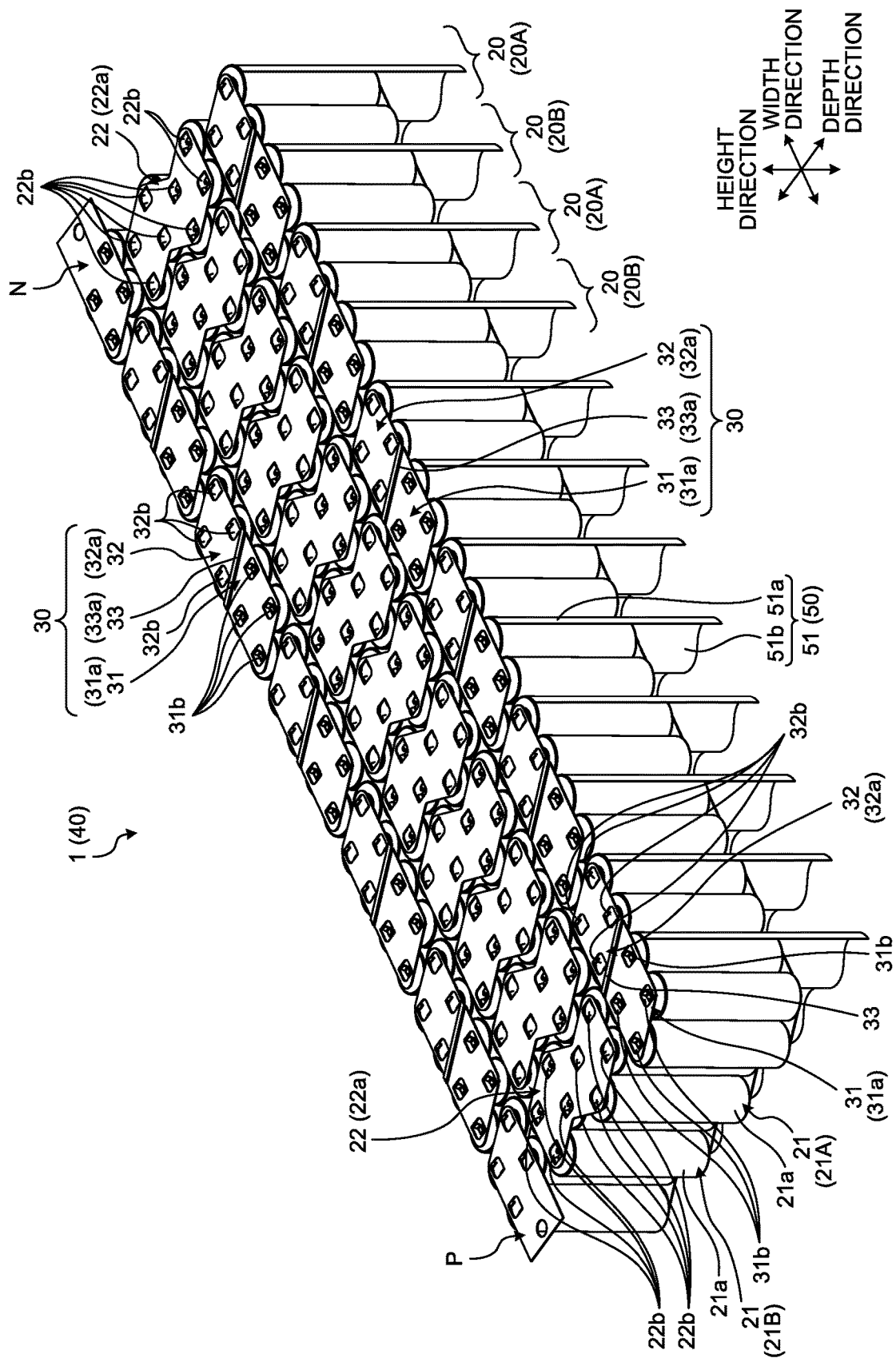
FIG. 1 is a perspective view illustrating a configuration example of a battery pack according to an embodiment.

A mode for carrying out the invention (embodiment) will be described in detail with reference to the accompanying drawings. The invention is not limited by the content described in the following embodiment. In addition, constituent elements which are easily assumed by those skilled in the art and substantially the same constituent elements are included in constituent elements to be described below. In addition, configurations to be described below can be appropriately combined. In addition, various omission, substitutions, and changes of configurations can be made in a range not departing from the gist of the invention.

Embodiment

A battery pack 1 according to an embodiment will be described. For example, the battery pack 1 is mounted on a vehicle such as an electric vehicle (EV), a hybrid vehicle (HEV), and a plug-in hybrid vehicle (PHEV). For example, the battery pack 1 is a power supply that supplies electric power to a drive source such as a motor of the vehicle. As illustrated in FIG. 1, FIG. 2, FIG. 3, FIG. 4, and FIG. 5, the battery pack 1 includes a housing 10, a plurality of battery modules 20, a plurality of bus bars 30 for modules, a heat conductive member 50, and a heat dissipation unit 60.

Here, a depth direction (first direction) is a direction in which a plurality of battery assemblies 21 of the battery modules 20 are arranged. A width direction (second direction) is a direction in which the plurality of battery modules 20 are arranged. A height direction is a direction in which a positive electrode and a negative electrode of a battery cell 21a are opposite to each other. The depth direction, the width direction, and the height direction intersect each other. In this embodiment, the depth direction, the width direction, and the height direction are orthogonal to each other. A mounting surface side in which the battery pack 1 is mounted on the vehicle is referred to as a lower side in the height direction, and a side opposite to the mounting surface side is referred to as an upper side in the height direction.

The housing 10 accommodates the respective battery modules 20 and the respective bus bars 30 for modules. The housing 10 is formed from a material having heat conductivity higher than that of a natural resin, and is formed from by iron, copper, aluminum, or the like as an example. The housing 10 is formed in a box shape having an inner space portion 11. For example, the housing 10 includes a box main body 12 that is formed in a rectangular shape or a cubic shape. The box main body 12 includes a bottom portion 12a that is located on a lower side in the height direction, a pair of first lateral surface portions (not illustrated) which face each other in the depth direction, and a pair of second lateral surface portions 12c which face each other in the width direction. In addition, the housing 10 includes an opening portion 13 that is formed by opening an upper side of the box main body 12 in the height direction, and a cover portion 14 that closes the opening portion 13. Furthermore, in the housing 10, in a case where a waterproof property is required in the battery pack 1, a waterproof structure is formed between the opening portion 13 and the cover portion 14 of the housing 10, and thus the inner space portion 11 is hermetically sealed. The housing 10 functions as the heat dissipation unit 60, and is provided at a location at which it is easy to release heat of the housing 10. For example, the housing 10 is provided at a location at which an outer surface of the housing 10 can come into contact with an outer heat medium such as external air that is received from the outside of the vehicle.

Figure 2:
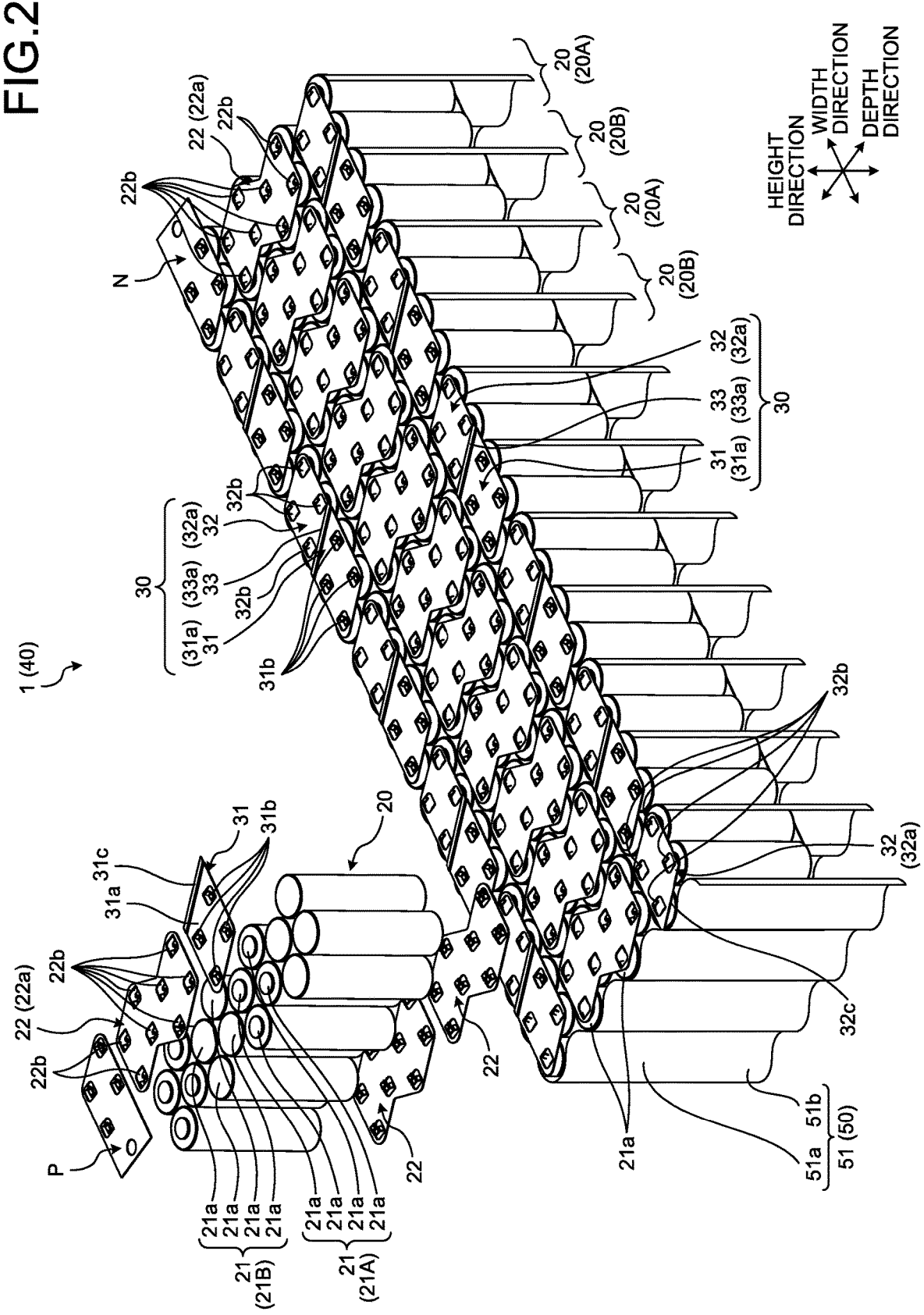
FIG. 2 is an exploded perspective view illustrating the configuration example of the battery pack according to the embodiment.

For example, each of the battery modules 20 includes a plurality of battery assemblies (battery bodies) 21 and a bus bar 22 for battery assemblies (refer to FIG. 2 and the like). Each of the battery assemblies 21 includes a plurality of battery cells 21a (for example, four battery cells 21a). Each of the battery cells 21a is configured as a secondary battery capable of being charged and discharged, and is configured as a cylindrical lithium ion battery that extends in the height direction as an example. For example, in the battery assembly 21, the battery cells 21a are arranged in two rows in the depth direction. In the battery assembly 21, the battery cells 21a are electrically connected to each other in parallel. In the battery assembly 21, the battery cells 21a are provided to be erected in the height direction, and the battery cells 21a are disposed to be adjacent to each other.

The bus bar 22 for battery assemblies electrically connects the battery assemblies 21 to each other. In the battery assemblies 21 which are adjacent to each other in the depth direction, the bus bar 22 for battery assemblies electrically connects a positive electrode of a battery assembly 21A on one side and a negative electrode of a battery assembly 21B on the other side, thereby connecting the battery assemblies 21A and 21B to each other in series. The bus bar 22 for battery assemblies is formed from a metallic material having conductivity. The bus bar 22 for battery assemblies includes a bus bar main body 22a that is formed in a flat plate shape, and a plurality of terminals 22b which are provided in the bus bar main body 22a. As the plurality of terminals 22b, for example, eight pieces are provided and are located at sites which face electrodes of the battery cells 21a of the battery assemblies 21 adjacent to each other. That is, in the battery assemblies 21A and 21B which are adjacent to each other, the terminals 22b are located at sites which face positive electrodes of the battery cells 21a of the battery assembly 21A on one side and negative electrodes of the battery cells 21a of the battery assembly 21B on the other side. The terminals 22b protrude from the bus bar main body 22a toward an electrode side of the battery cells 21a. For example, the terminals 22b are electrically connected to electrodes of the battery cells 21a in the battery assemblies 21 adjacent to each other through resistance welding. According to this, the bus bar 22 for battery assemblies can connect the battery assemblies 21, which are adjacent to each other, in series. In one of the battery modules 20, even-numbered (for example, four) battery assemblies 21 are arranged to be adjacent to each other in the depth direction. In the one battery module 20, four battery assemblies 21 are connected to each other in series, and thus the one battery module 20 includes a total of sixteen battery cells 21a.

Each of the bus bars 30 for modules electrically connects the battery modules 20 to each other (refer to FIG. 1, FIG. 2, and the like). In the battery modules 20 which are adjacent in the width direction, the bus bar 30 for modules electrically connect positive electrodes of a battery module 20A on one side and negative electrodes of a battery module 20B on the other side in series, thereby connecting the battery modules 20A and 20B in series. The bus bar 30 for modules is provided on an upper side in the height direction of the battery modules 20. The reason for this is because each of the battery modules 20 is constructed by arranging the battery assemblies 21 in an even number. That is, in the battery modules 20, the battery assemblies 21 are arranged in an even number, and thus electrodes of the bus bar 30 for modules which connect the battery modules 20 which are adjacent to each other are located on one side (for example, on an upper side) in the height direction of the battery modules 20. The bus bar 30 for modules includes a first bus bar piece 31 as a first bus bar for modules, a second bus bar piece 32 as a second bus bar for modules, and a connection portion 33.

The first bus bar piece 31 is formed from a metallic material having conductivity. The first bus bar piece 31 includes a bus bar main body 31a that is formed in a flat plate shape, and a plurality of terminals 31b which are provided in the bus bar main body 31a. The bus bar main body 31a includes a first joining surface 31c (refer to FIG. 2). The first joining surface 31c is an end surface that is provided on an adjacent battery module 20 side. The first joining surface 31c is joined to a second joining surface 32c of the second bus bar piece 32 to be described later. As the plurality of terminals 31b, for example, four pieces are provided and are located at sites which face electrodes of the battery cells 21a in the battery assembly 21 of the battery modules 20 adjacent to each other. That is, in the battery modules 20 which are adjacent to each other, the terminals 31b are located at sites which face one side between positive electrodes and negative electrodes of the battery cells 21a in the battery assembly 21 of the battery module 20A on one side. The terminals 31b protrude from the bus bar main body 31a toward electrodes of the battery cells 21a. The terminals 31b are electrically connected to the electrodes of the battery cells 21a of the battery assembly 21 in the battery module 20A on one side through resistance welding.

The second bus bar piece 32 is a bus bar different from the first bus bar piece 31. That is, the first bus bar piece 31 and the second bus bar piece 32 as individual bodies are connected by the connection portion 33 to form the bus bar 30 for modules. The second bus bar piece 32 is formed from a metallic material having conductivity. The second bus bar piece 32 includes a bus bar main body 32a that is formed in a flat plate shape, and a plurality of terminals 32b which are provided in the bus bar main body 32a. The bus bar main body 32a includes the second joining surface 32c (refer to FIG. 2). The second joining surface 32c is an end surface that is provided on an adjacent battery module 20 side. The second joining surface 32c is connected to the first joining surface 31c of the first bus bar piece 31. As the plurality of terminals 32b, for example, four pieces are provided and are located at sites which face electrodes of the battery cells 21a in the battery assembly 21 of the battery modules 20 adjacent to each other. That is, in the battery modules 20 which are adjacent to each other, the terminals 32b are located at sites which face the other side between positive electrodes and negative electrodes of the battery cells 21a in the battery assembly 21 of the battery module 20B on the other side. The terminals 32b protrude from the bus bar main body 32a toward electrodes of the battery cells 21a. The terminals 32b are electrically connected to the electrodes of the battery cells 21a of the battery assembly 21 in the battery module 20B on the other side through resistance welding.

The connection portion 33 connects the first bus bar piece 31 and the second bus bar piece 32. For example, the connection portion 33 includes a solidification portion 33a that is melted by using laser light as a heat source and is solidified. The solidification portion 33a is formed as follows. A joining site at which the first joining surface 31c and the second joining surface 32c are joined is irradiated with laser light, and the joining site is melted by the laser light and is solidified to form the solidification portion 33a. According to this, the connection portion 33 can connect the first bus bar piece 31 and the second bus bar piece 32 in a state in which the first joining surface 31c and the second joining surface 32c are joined to each other. As a result, the bus bar 30 for modules can connect the battery modules 20 adjacent to each other in series.

The heat conductive member 50 conducts heat. The heat conductive member 50 includes a plurality of heat conductive sheets 51 which are formed in a sheet shape. The heat conductive sheets 51 are formed form a heat conductive material having heat conductivity higher than that of a natural resin. Examples of the heat conductive material include graphite, a synthetic resin that contains a heat conductive filler, and metals such as copper and aluminum. For example, the heat conductive sheets 51 in this embodiment are formed from sheet-shaped graphite, and have flexibility. For example, each of the heat conductive sheets 51 is formed in the same shape (for example, a rectangular shape). The heat conductive sheet 51 is provided between the plurality of battery modules 20 which are adjacent to each other in the width direction. That is, the heat conductive sheet 51 is located in a state of being interposed between the battery module 20A on one side and the battery module 20B on the other side in the battery modules 20 which are adjacent to each other. In other words, the battery modules 20 which are adjacent to each other face each other with the heat conductive sheet 51 interposed therebetween. The heat conductive sheet 51 is in contact with outer peripheral surfaces of the battery cells 21a of the battery modules 20 which are adjacent each other and is connected to the battery cells 21a in a heat conductive manner. Here, a configuration in which the heat conductive sheet 51 is connected to the battery cells 21a in a heat conductive manner includes a case where the heat conductive sheet 51 and the battery cells 21a are in direct contact with each other and heat (heat energy) transfer is possible therebetween, a case where the heat conductive sheet 51 and the battery cells 21a are in indirect contact with each other through an insulator and the like, and heat transfer is possible therebetween, and the like.

Figure 3:
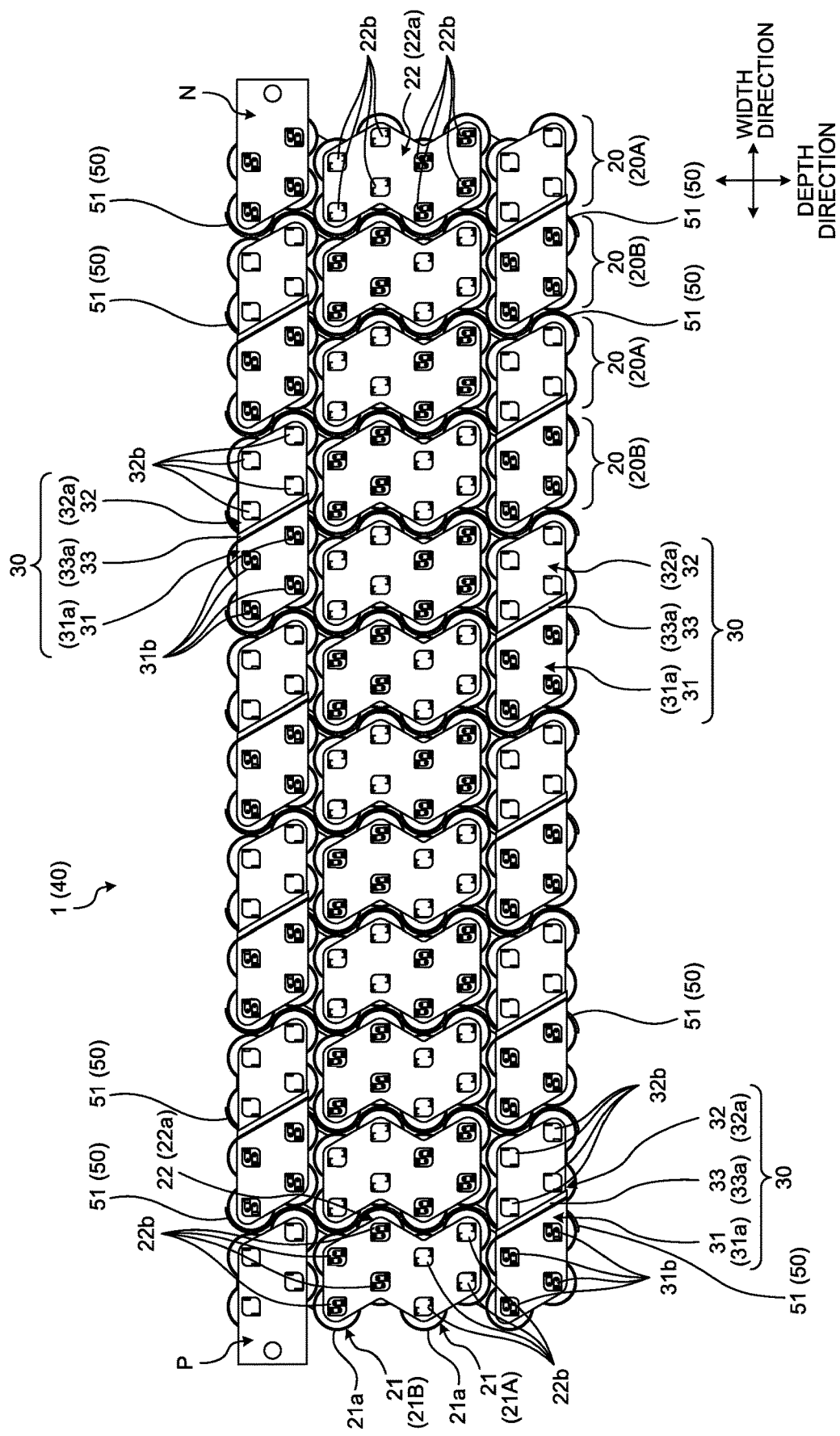
FIG. 3 is a top view illustrating the configuration example of the battery pack according to the embodiment.
Figure 4:
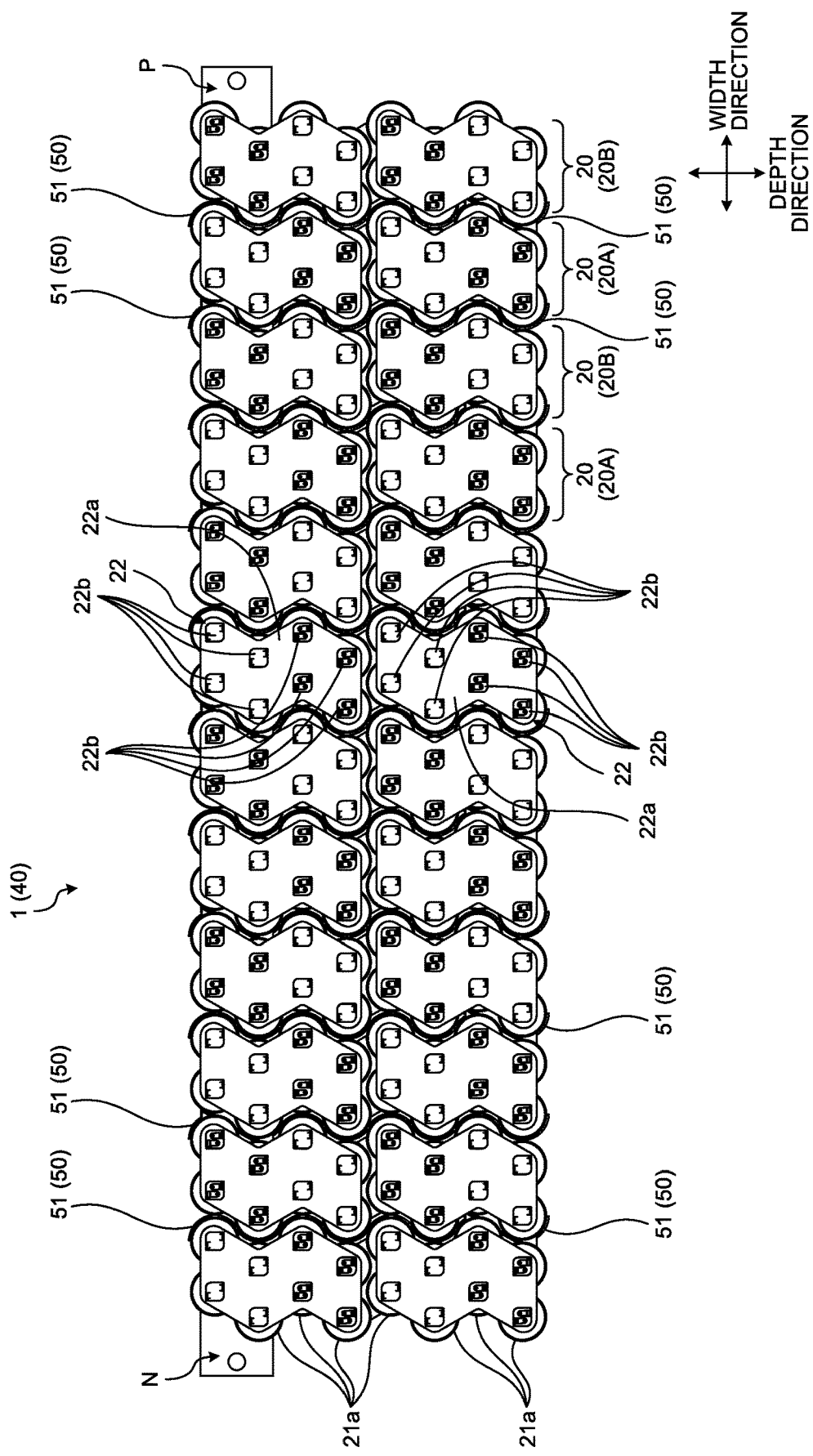
FIG. 4 is a bottom view illustrating the configuration example of the battery pack according to the embodiment.

As illustrated in FIG. 3, FIG. 4, and the like, when viewed from the height direction, the heat conductive sheet 51 is formed in a wave shape along outer peripheral surfaces of the battery cells 21a arranged in the depth direction in the battery modules 20. That is, the heat conductive sheet 51 is interposed between the battery modules 20 which are adjacent to each other, and is deformed in a wave shape along the shape of the outer peripheral surfaces of the battery cells 21a.

The heat conductive sheet 51 includes a contact portion 51a and an extended portion 51b. The contact portion 51a is a portion that is in contact with the outer peripheral surfaces of the battery cells 21a of the battery modules 20 which are adjacent to each other in the width direction. The contact portion 51a extends from one end of the battery modules 20 to the other end thereof in the depth direction, and extends from an upper end of the battery modules 20 to a lower end of the battery modules 20 in the height direction. That is, when the battery modules 20 are viewed from the width direction, the contact portion 51a extends in a range corresponding to the entirety of an end surface of the battery modules 20 (refer to FIG. 2).

Figure 5:
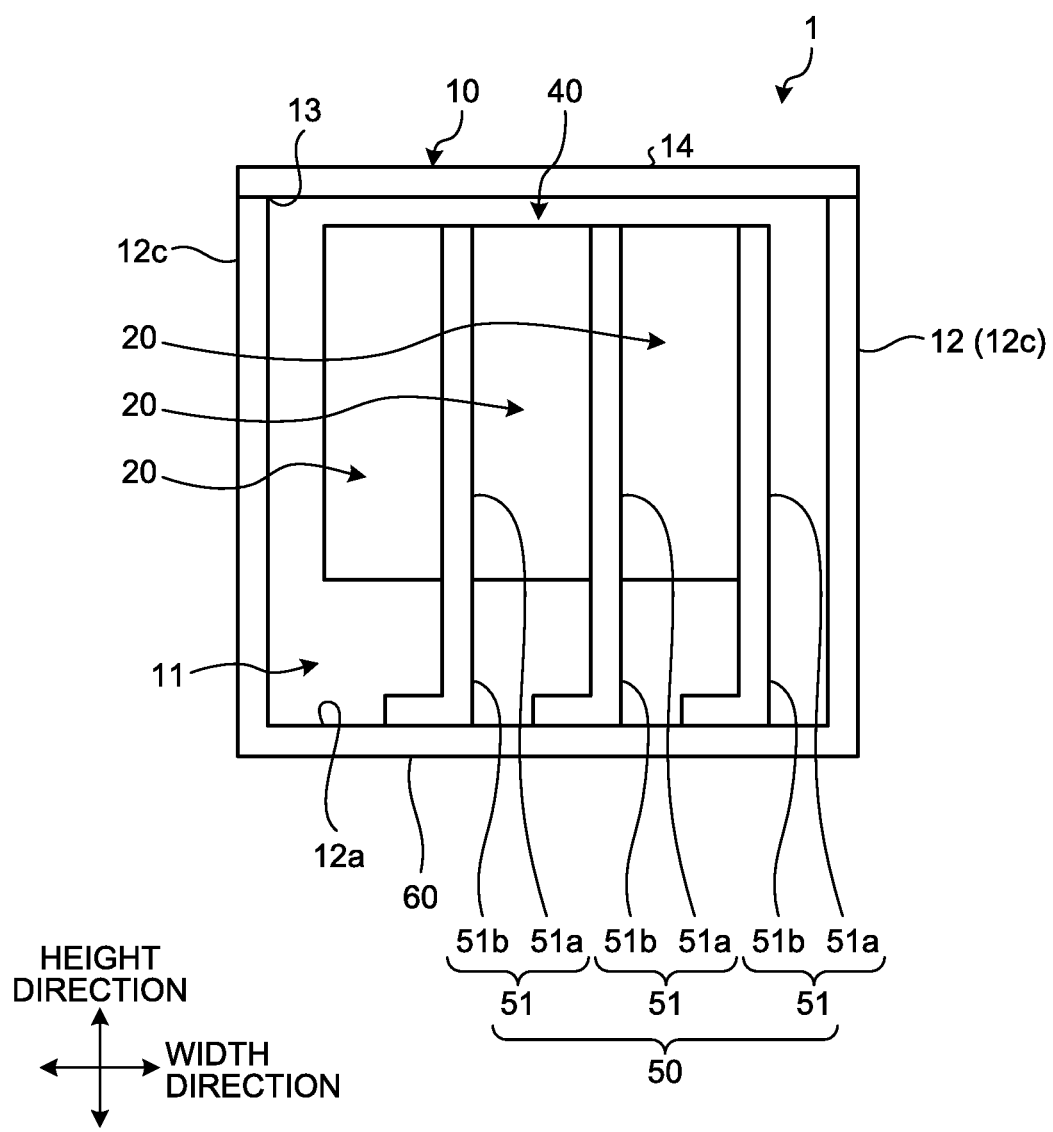
FIG. 5 is a schematic view illustrating the configuration example of the battery pack according to the embodiment.

The extended portion 51b extends from one end of the battery modules 20 to the other end thereof in the depth direction, and extends from a lower end of the battery modules 20 to the bottom portion 12a of the housing 10 in the height direction. In this manner, the extended portion 51b extends from a lower end of the battery modules 20 in the height direction to the bottom portion 12a of the housing 10. That is, the extended portion 51b extends from an end of the battery modules 20 on a side opposite to the bus bar 30 for modules to the bottom portion 12a of the housing 10. According to this, in the heat conductive sheet 51, it is possible to prevent the bus bar 30 for modules from interfering with the extended portion 51b. For example, as illustrated in FIG. 5, in a state of being accommodated in the housing 10, the extended portion 51b is formed in an L-shape by bending an end of the extended portion 51b on the bottom portion 12a side of the housing 10. In the extended portion 51b, the L-shaped end is in surface contact with the bottom portion 12a of the housing 10 (heat dissipation unit), and thus heat conduction from the heat conductive sheet 51 to the bottom portion 12a of the housing 10 is promoted, thereby enhancing heat dissipation effect.

The heat dissipation unit 60 is a heat dissipating portion. Here, the housing 10 also has a function of the heat dissipation unit 60. The housing 10 is connected to the extended portion 51b of the heat conductive sheet 51. As described above, the housing 10 has heat conductivity and is provided at a location that can come into contact with an outer heat medium such as external air. According to this, the housing 10 can dissipate heat of the battery cells 21a which is conducted through the heat conductive sheet 51.

The battery modules 20 constitute a battery module group 40 in which the battery assemblies 21 are connected in series by the bus bar 22 for battery assemblies, and the battery modules 20 are connected in series by the bus bar 30 for modules. The battery module group 40 is accommodated in the inner space portion 11 of the housing 10. In addition, the battery module group 40 includes a holding member (not illustrated), and is held to the housing 10 by the holding member. For example, in the battery module group 40, twelve battery modules 20 are connected in series, and thus the battery module group 40 includes a total of 192 battery cells 21a. The battery pack 1 is mounted on a vehicle and the like in a state in which the battery module group 40 is held in the housing 10.

As described above, the battery pack 1 according to this embodiment includes the battery module group 40, the heat conductive member 50, and the heat dissipation unit 60. The battery module group 40 includes the plurality of battery modules 20 and the bus bar 30 for modules. The plurality of battery modules 20 include the plurality of battery assemblies 21 and the bus bar 22 for battery assemblies. The plurality of battery assemblies 21 include the plurality of battery cells 21a which are connected in parallel, are provided to be erected in the height direction in which a positive electrode and a negative electrode are opposite to each other, and are arranged in an even number in the depth direction orthogonal to the height direction. The bus bar 22 for battery assemblies connects the battery assemblies 21, which are adjacent to each other in the depth direction, in series. The bus bar 30 for modules connects the battery modules 20, which are adjacent to each other in the width direction among the plurality of battery modules 20 arranged in the width direction intersecting in the depth direction, in series. The heat conductive member 50 has heat conductivity, and is provided between the plurality of battery modules 20 which are adjacent to each other in the width direction. The heat dissipation unit 60 dissipates heat that is conducted to the heat conductive member 50. In addition, the bus bar 30 for modules is provided on one side of the battery modules 20 in the height direction. The heat conductive member 50 includes the contact portion 51a and the extended portion 51b. The contact portion 51a is in contact with the plurality of battery modules 20 which are adjacent to each other in the width direction. The extended portion 51b extends from a side of the battery modules 20 which is opposite to the bus bar 30 for modules in the height direction, and is connected to the heat dissipation unit 60.

According to the configuration, in the battery pack 1, since the heat conductive member 50 extends in the height direction, it is possible to dissipate heat of the battery assemblies 21 in a more uniform manner in comparison to a case where the heat conductive member extends in an arrangement direction (depth direction) of the plurality of battery assemblies 21 as in the related art. In addition, in the battery pack 1, since the heat conductive member 50 extends from a side opposite to the bus bar 30 for modules, it is possible to prevent the bus bar 30 for modules from interfering with the heat conductive member 50. According to this configuration, in the battery pack 1, it is possible to use the heat conductive member 50 that is formed in the same shape, and thus it is possible to uniformly dissipate heat of the battery assemblies 21 of the battery modules 20. As a result, in the battery pack 1, it is possible to appropriately dissipate heat of the battery assemblies 21.

The battery pack 1 includes the housing 10 that has heat conductivity and accommodates the battery module group 40 and the heat conductive member 50. The extended portion 51b is in contact with an inner side of the housing 10. The housing 10 functions as the heat dissipation unit 60. According to this configuration, in the battery pack 1, heat of the battery cells 21a is conducted to the housing 10 through the extended portion 51b, and it is possible to dissipate heat conducted to the housing 10. In the battery pack 1, the housing 10 is also allowed to function as the heat dissipation unit 60, and thus it is possible to simplify a configuration of the battery pack 1.

In the battery pack 1, the heat conductive member 50 includes the plurality of heat conductive sheets 51 which are formed in the same sheet shape, and each of the heat conductive sheets 51 is provided between the plurality of battery modules 20 which are adjacent to each other. Here, in a battery pack of the related art, the battery assemblies 21 are arranged in an odd number, and thus the bus bar 30 for modules is provided on an upper side and a lower side of the battery modules 20 in the height direction. According to this, in the battery pack of the related art, the bus bar 30 for modules may interfere with the heat conductive sheets 51. In this case, it is necessary to provide a notch and the like in the heat conductive sheets 51, and thus shapes of the heat conductive sheets 51 are not the same as each other. Accordingly, in the heat conductive sheets of the related art, a difference in heat conduction from the battery cells 21a occurs, and it is difficult to uniformly dissipate heat of the battery cells 21a. In addition, in the heat conductive sheets of the related art, it is necessary to prepare a plurality of the heat conductive sheets having shapes different from each other, and thus there is a problem that management of part numbers of the heat conductive sheets becomes complicate. In contrast, in the battery pack 1 of this embodiment, the bus bar 30 for modules is provided on one side of the battery modules 20 in the height direction, and thus the heat conductive sheets 51 can be formed in the same shape. According to this, in the battery pack 1, it is possible to uniformly dissipate heat of the battery cells 21a, and it is possible to easily manage part numbers of the heat conductive sheets 51.

With regard to the battery pack 1, in the battery assemblies 21, the plurality of battery cells 21a are arranged in two rows in the depth direction. According to this configuration, in the battery pack 1, the heat conductive sheet 51 can come into contact with the entirety of the battery cells 21a, and it is possible to effectively dissipate heat of the battery cells 21a.

In the battery pack 1, the bus bar 30 for modules include the first bus bar piece 31 that is provided in a battery module 20 on one side between the battery modules 20 which are adjacent to each other, and the second bus bar piece 32 that is provided in a battery module 20 on the other side and is different from the first bus bar piece 31, and the connection portion 33 that connects the first bus bar piece 31 and the second bus bar piece 32. According to this configuration, in the battery pack 1, the battery assemblies 21 are connected to each other by the bus bar 22 for battery assemblies, and it is possible to form individual battery modules 20 which are subdivided from the entirety of the battery modules 20 (battery module group 40). In the battery pack of the related art, the entirety of the battery assemblies 21 are connected through resistance welding. Therefore, in a case where welding failure occurs in the course of the resistance welding, it is necessary to discard the battery cells 21a (for example, 192 pieces to the maximum) which are welded at that time, and thus manufacturing loss was relatively great. In contrast, in the battery pack 1 of this embodiment, the battery assemblies 21 are connected through resistance welding in a unit of the battery module 20. Accordingly, even when welding failure occurs in the resistance welding in the course of the resistance welding, the battery cells 21*a* (for example, sixteen pieces) corresponding to one battery module 20 to the maximum may be discarded, and thus it is possible to further suppress the manufacturing loss in comparison to the battery pack of the related art. In addition, in the battery pack 1 of the embodiment, for example, the first bus bar piece 31 and the second bus bar piece 32 are welded with a laser to connect the battery modules 20 to each other, and thus even when the welding failure occurs in the laser welding, it is possible to attempt the laser welding again, and thus it is also possible to suppress the battery modules 20 from being discarded. In addition, in the battery pack 1, the entirety of a plurality of the bus bar 30 for modules are provided on an upper side of the battery modules 20 in the height direction, and thus it is possible to weld the entirety of a plurality of the first bus bar pieces 31 and a plurality of the second bus bar pieces 32 with a laser from an upper side in the height direction. As a result, it is possible to improve workability. In addition, in the battery pack 1, total positive electrodes P and total negative electrodes N, which are connected to a load unit (not illustrated) that supplies electric power, can be located on one side (for example, an upper side) in the height direction, and thus it is possible to improve workability of wiring connection to the load unit.

Modification Example

Next, a modification example of the embodiment will be described. Description has been given of an example in which in the battery modules 20, the battery assemblies 21 including the plurality of battery cells 21*a* are connected to each other, but there is no limitation thereto. In the battery modules 20, battery bodies which respectively include one battery cell 21*a* may be connected to each other.

In addition, description has been given of an example in which the bus bar 30 for modules which includes the connection portion 33 that connects the first bus bar piece 31 and the second bus bar piece 32, but there is no limitation thereto. For example, the bus bar 30 for modules may be configured as one sheet of flat plate-shaped bus bar that does not include the connection portion 33. That is, the bus bar 30 for modules may be configured as one sheet of flat plate-shaped bus bar that does not include joining surfaces for joining bus bars different from each other.

In addition, description has been given of an example in which the contact portion 51*a* of the heat conductive sheets 51 extends from one end of the battery modules 20 to the other end thereof in the depth direction, but there is no limitation thereto. The contact portion 51*a* may extend only to the central portion excluding both ends of the battery modules 20 in the depth direction. For example, the contact portion 51*a* may extend in a range excluding the battery cells 21*a* on both ends of the battery modules 20 in the depth direction. The reason for this is because a temperature of the battery cells 21*a* on both ends of the battery modules 20 may be lower in comparison to the battery cells 21*a* at the central portion, and thus the heat conductive sheets 51 may not be used.

In addition, description has been given of an example in which in the heat conductive sheets 51, the extended portion 51*b* is in contact with the bottom portion 12*a* of the housing 10 to dissipate heat, but there is no limitation thereto. For example, in the heat conductive sheets 51, the extended portion 51*b* may be immersed in a flowable member stored in the bottom portion 12*a* of the housing 10 to dissipate heat. Furthermore, the flowable member is a liquid having flowability, heat conductivity, and a heat accumulation property. Examples of the liquid having the flowability, the heat conductivity, and the heat accumulation property include water, oils such as silicon oil, ethylene glycol, glycerin, acetone, brine, and the like.

In addition, description has been given of an example in which in the battery assemblies 21, the plurality of battery cells 21*a* are arranged in two rows in the depth direction, but there is no limitation thereto. The plurality of battery cells 21*a* may be arranged in three rows.

In addition, description has been given of an example in which the connection portion 33 includes a solidification portion 33*a* that is melted by using laser light as a heat source and is solidified, but there is no limitation thereto. For example, the connection portion 33 may be provided with a screw fastening unit that includes a nut having a fastening opening, and a bolt inserted into the opening and is fastened to the nut. In addition, the connection portion 33 may include a connector connection portion including a male connector provided with a first terminal, and a female connector provided with a second terminal that is fitted around the male connector and is electrically connected to the first terminal.

In addition, the number of the battery cells 21*a* of each of the battery assemblies 21 may be two or greater without limitation to four.

In addition, the number of the terminals 22*b* of the bus bar 22 for battery assemblies is appropriately changed in correspondence with the number of the battery cells 21*a* of each of the battery assemblies 21. In addition, the number of the terminals 31*b* and 32*b* of the bus bar 30 for modules is appropriately changed in correspondence with the number of the battery cells 21*a* of the battery assembly 21.

In addition, the number of the battery assemblies 21 of the battery module 20 may be an even number of two or greater without limitation to four.

In the battery pack according to the embodiment, since the heat conductive member includes the extended portion that extends in the height direction from a side opposite to the bus bar for modules of the battery module, and is connected to the heat dissipation unit, it is possible to prevent the bus bar for modules from interfering the heat conductive member, and thus it is possible to appropriately dissipate heat of the battery body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery pack comprising:
a battery module group that includes a plurality of battery modules including a plurality of battery bodies which include one battery cell or a plurality of the battery cells connected to each other in parallel, which are provided to be erected in a height direction in which a positive electrode and a negative electrode are opposite to each other, and which are arranged in an even number in a first direction orthogonal to the height direction, and a bus bar for battery bodies which connects the battery bodies adjacent to each other in the first direction in series, and a bus bar for modules which connects the battery modules, which are adjacent to each other in a second direction among the plurality of battery modules arranged in the second direction orthogonal to the first direction, in series;
a heat conductive member that has heat conductivity, and is provided between the plurality of battery modules which is arranged in the first direction and adjacent to each other in the second direction; and
a heat dissipation unit that dissipates heat conducted to the heat conductive member, wherein
the bus bar for modules is provided on one side of the battery modules in the height direction and is not provided on the other side of the battery modules in the height direction, and
the heat conductive member includes a contact portion that is in contact with the plurality of battery modules which is arranged in the first direction and adjacent to each other in the second direction, and an extended portion that extends from a side opposite to the bus bar for modules of the battery modules in the height direction and is connected to the heat dissipation unit.

2. The battery pack according to claim 1, further comprising:
a housing that has heat conductivity and accommodates the battery module group and the heat conductive member, wherein
the extended portion is in contact with an inner side of the housing, and
the housing functions as the heat dissipation unit.

3. The battery pack according to claim 2, wherein
the heat conductive member includes a plurality of heat conductive sheets which are formed in the same sheet shape, and each of the heat conductive sheets is provided between the plurality of battery modules adjacent to each other.

4. The battery pack according to claim 2, wherein
in the battery bodies, the plurality of battery cells are arranged in two rows in the first direction.

5. The battery pack according to claim 2, wherein
the bus bar for modules includes a first bus bar for modules which is provided in a battery module on one side between the battery modules adjacent to each other, a second bus bar for modules which is provided in the battery module on the other side and is different from the first bus bar for modules, and a connection portion that connects the first bus bar for modules and the second bus bar for modules.

6. The battery pack according to claim 1, wherein
the heat conductive member includes a plurality of heat conductive sheets which are formed in the same sheet shape, and each of the heat conductive sheets is provided between the plurality of battery modules adjacent to each other.

7. The battery pack according to claim 6, wherein
in the battery bodies, the plurality of battery cells are arranged in two rows in the first direction.

8. The battery pack according to claim 6, wherein
the bus bar for modules includes a first bus bar for modules which is provided in a battery module on one side between the battery modules adjacent to each other, a second bus bar for modules which is provided in the battery module on the other side and is different from the first bus bar for modules, and a connection portion that connects the first bus bar for modules and the second bus bar for modules.

9. The battery pack according to claim 1, wherein
in the battery bodies, the plurality of battery cells are arranged in two rows in the first direction.

10. The battery pack according to claim 9, wherein
the bus bar for modules includes a first bus bar for modules which is provided in a battery module on one side between the battery modules adjacent to each other, a second bus bar for modules which is provided in the battery module on the other side and is different from the first bus bar for modules, and a connection portion that connects the first bus bar for modules and the second bus bar for modules.

11. The battery pack according to claim 1, wherein
the bus bar for modules includes a first bus bar for modules which is provided in a battery module on one side between the battery modules adjacent to each other, a second bus bar for modules which is provided in the battery module on the other side and is different from the first bus bar for modules, and a connection portion that connects the first bus bar for modules and the second bus bar for modules.

* * * * *